United States Patent
Lu et al.

(10) Patent No.: US 11,630,267 B2
(45) Date of Patent: Apr. 18, 2023

(54) FERRULE BOOT FOR OPTICAL CONNECTORS

(71) Applicant: COMMSCOPE TECHNOLOGIES LLC, Hickory, NC (US)

(72) Inventors: Yu Lu, Eden Prairie, MN (US); Jaime Gonzalez Batista, Prior Lake, MN (US); Scott L. Carlson, Bloomington, MN (US)

(73) Assignee: CommScope Technologies LLC, Hickhory, NC (US)

( * ) Notice: Subject to any disclaimer, the term of this patent is extended or adjusted under 35 U.S.C. 154(b) by 0 days.

(21) Appl. No.: 17/272,174

(22) PCT Filed: Aug. 22, 2019

(86) PCT No.: PCT/US2019/047715
§ 371 (c)(1),
(2) Date: Feb. 26, 2021

(87) PCT Pub. No.: WO2020/046711
PCT Pub. Date: Mar. 5, 2020

(65) Prior Publication Data
US 2021/0215892 A1 Jul. 15, 2021

Related U.S. Application Data

(60) Provisional application No. 62/725,841, filed on Aug. 31, 2018.

(51) Int. Cl.
*G02B 6/38* (2006.01)
*G02B 6/36* (2006.01)

(52) U.S. Cl.
CPC ......... *G02B 6/3885* (2013.01); *G02B 6/3636* (2013.01); *G02B 6/3821* (2013.01); *G02B 6/3888* (2021.05)

(58) Field of Classification Search
CPC ..................................................... G02B 6/3885
See application file for complete search history.

(56) References Cited

U.S. PATENT DOCUMENTS

| 5,214,730 | A | 5/1993 | Nagasawa et al. |
| 6,085,003 | A | 7/2000 | Knight |
| 7,354,202 | B1 * | 4/2008 | Luger .................. G02B 6/3889 385/80 |

(Continued)

FOREIGN PATENT DOCUMENTS

| JP | 2001-66466 A | * | 3/2001 |
| JP | 2005-234498 A | * | 9/2005 |
| KR | 10-2017-0013685 A | | 2/2017 |

OTHER PUBLICATIONS

International Search Report and Written Opinion of the International Searching Authority for International Patent Application No. PCT/US2019/047715 dated Dec. 16, 2019, 10 pages.

*Primary Examiner* — Michael Stahl
(74) *Attorney, Agent, or Firm* — Merchant & Gould P.C.

(57) ABSTRACT

The present disclosure relates to a ferrule boot for mounting in a multi-fiber ferrule. The ferrule boot may include a body member that has a distal end and a proximal end. The body member may define a plurality of openings that extend lengthwise therethrough with each opening being configured for receiving a respective one of a plurality of optical fibers.

9 Claims, 15 Drawing Sheets

(56) References Cited

U.S. PATENT DOCUMENTS

| | | |
|---|---|---|
| 8,684,611 B2 | 4/2014 | Childers et al. |
| 9,690,057 B2 | 6/2017 | Anderson et al. |
| 9,791,635 B2 | 10/2017 | Richmond et al. |
| 9,810,851 B2 | 11/2017 | Lu |
| 2006/0115218 A1* | 6/2006 | Howard ............... G02B 6/3849 |
| | | 385/59 |
| 2013/0136401 A1 | 5/2013 | Cooke et al. |
| 2015/0355415 A1 | 12/2015 | Cline et al. |
| 2017/0160494 A1* | 6/2017 | Watanabe ............ G02B 6/3874 |
| 2017/0343746 A1 | 11/2017 | Anderson et al. |
| 2018/0188463 A1 | 7/2018 | Szumacher et al. |
| 2018/0210153 A1* | 7/2018 | Daily .................. G02B 6/3857 |

* cited by examiner

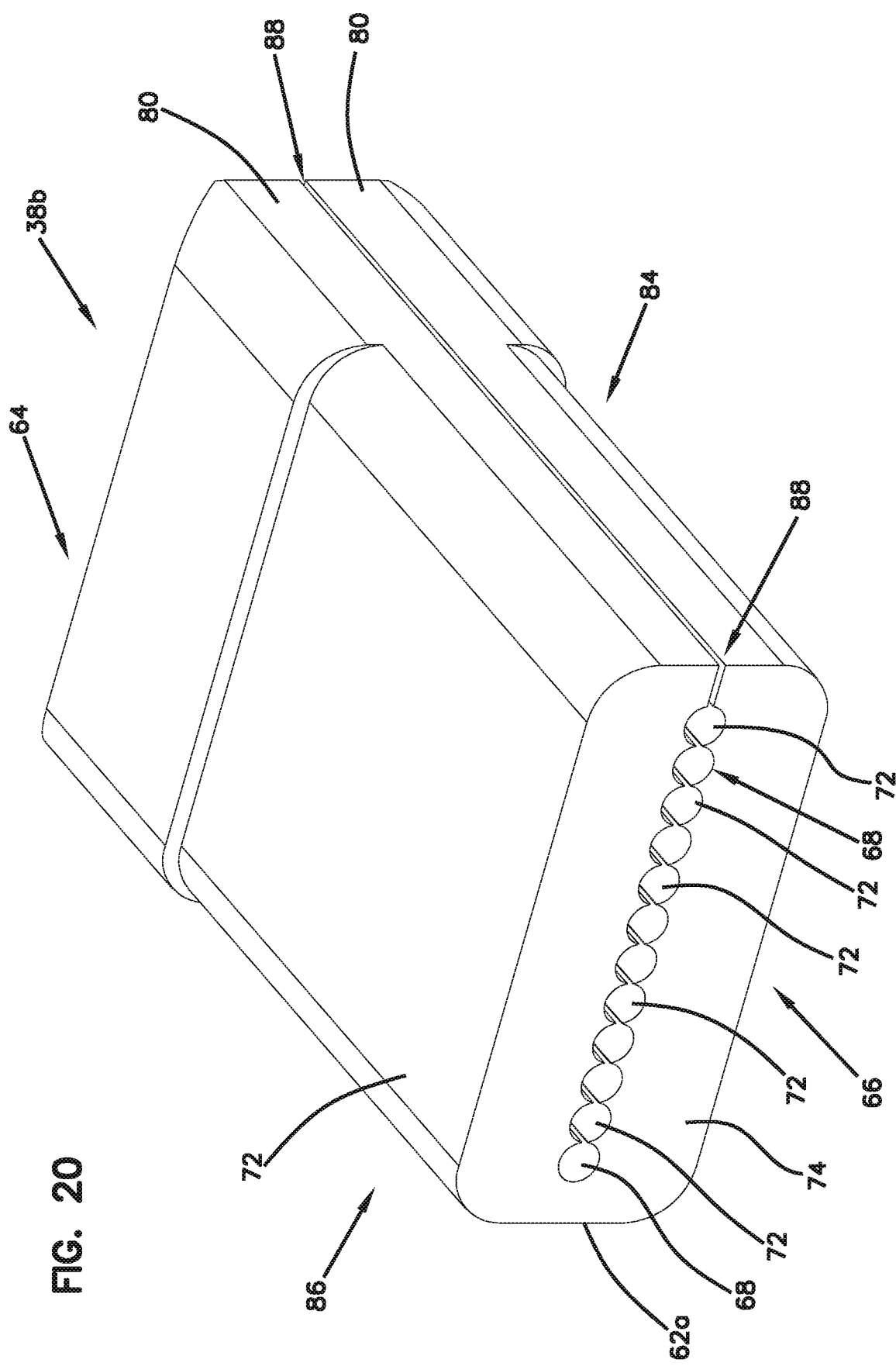

FERRULE BOOT FOR OPTICAL CONNECTORS

CROSS-REFERENCE TO RELATED APPLICATION

This application is a National Stage Application of PCT/US2019/047715, filed on Aug. 22, 2019, which claims the benefit of U.S. Patent Application Ser. No. 62/725,841, filed on Aug. 31, 2018, the disclosures of which are incorporated herein by reference in their entireties. To the extent appropriate, a claim of priority is made to each of the above disclosed applications.

TECHNICAL FIELD

The present disclosure relates generally to fiber optic connectors. More specifically, the present disclosure relates to multi-fiber fiber optic connectors having a ferrule boot.

BACKGROUND

A multi-fiber fiber optic connector, for example an MPO connector, typically includes a connector housing supporting a multi-fiber ferrule at a distal end and a connector boot at a proximal end. Example multi-fiber fiber optic connectors are disclosed by U.S. Pat. Nos. 5,214,730; 6,085,003 and 8,684,611.

A conventional multi-fiber fiber optic connector includes a connector housing or plug, a multi-fiber ferrule such as an MT ferrule mounted upon end portions of a plurality of optical fibers, a spring and a spring push. Typically, the multi-fiber ferrule is positioned within a lengthwise extending passageway defined by the connector housing. As generally known in the art, a fiber optic ribbon can be attached to the multi-fiber fiber optic connector using an adhesive, such as, an epoxy resin. The conventional multi-fiber fiber optic connector makes use of a ferrule boot that is positioned over exposed fiber optic ribbon such that the ferrule boot and fiber optic ribbon are securely adhered to a portion of the multi-fiber ferrule or the multi-fiber fiber optic connector.

A ferrule boot functions to provide a certain strain relief to an optical fiber ribbon, particularly where no protecting plug hardware is present. The ferrule boot also helps to prevent epoxy resin from flowing out of the multi-fiber fiber optic connector. As is well known, the ferrule boot typically is the first component installed onto an optical fiber ribbon. A typical ferrule boot includes a single elongated slot sized to receive an optical fiber ribbon.

SUMMARY

Aspects of the present disclosure relate to a ferrule boot for protecting loose optical fibers connected to a connector assembly. The ferrule boot can include a body member that has a distal end and a proximal end. The body member defines a plurality of openings that extend lengthwise therethrough for receiving a respective one of a plurality of optical fibers.

Another aspect of the present disclosure relates to a multi-fiber fiber optic connector. The multi-fiber fiber optic connector can include a connector body that has a distal end and a proximal end; a multi-fiber ferrule that has an end face accessible at the distal end of the connector body. The multi-fiber ferrule may have a row of fiber holes for supporting a plurality of optical fibers. A ferrule boot can be coupled to the multi-fiber ferrule. The ferrule boot defines a plurality of openings that extend lengthwise therethrough for receiving a respective one of the plurality of optical fibers. A spring push can be positioned behind the multi-fiber ferrule and a spring can be positioned between the spring push and the multi-fiber ferrule for biasing the multi-fiber ferrule in a distal direction relative to the connector body. The multi-fiber fiber optic connector further includes a connector boot that mounts at the proximal end of the connector body to provide bend radius protection.

A further aspect of the present disclosure relates to a connectorized fiber optic cabling assembly. The connectorized fiber optic cabling assembly includes a fiber optic cable. The fiber optic cable includes a plurality of optical fibers; at least one strength member that surrounds the plurality of optical fibers; and a cable jacket that surrounds the at least one strength member; and a connector assembly mounted on a first end of the fiber optic cable. The connector assembly includes a connector housing that defines fiber passages; a multi-fiber ferrule mounted within the connector housing; and a ferrule boot coupled to the multi-fiber ferrule. The ferrule boot defines a plurality of openings that extend lengthwise therethrough for receiving a respective one of the plurality of optical fibers. The connector assembly further includes a spring mounted within the connector housing rearward of the multi-fiber ferrule; and a strain relief boot that extends rearwardly from the connector housing. The plurality of optical fibers extend through the strain relief boot, the fiber passage and the spring into the ferrule boot and the multi-fiber ferrule. The plurality of optical fibers are aligned in a row in a loose configuration within the ferrule boot.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 20 is another example ferrule boot with a longitudinal slot in accordance with the present disclosure.

DETAILED DESCRIPTION

Optical ribbon fibers are commonly used with multi-fiber connectors such as the MT type ferrule and connector. Ribbon structures are commonly used in the industry to hold optical fibers during preparation for insertion into fiber optic ferrules. In certain examples, the new ferrule assembly can be particularly useful for non-ribbonized fiber.

Figure 1:
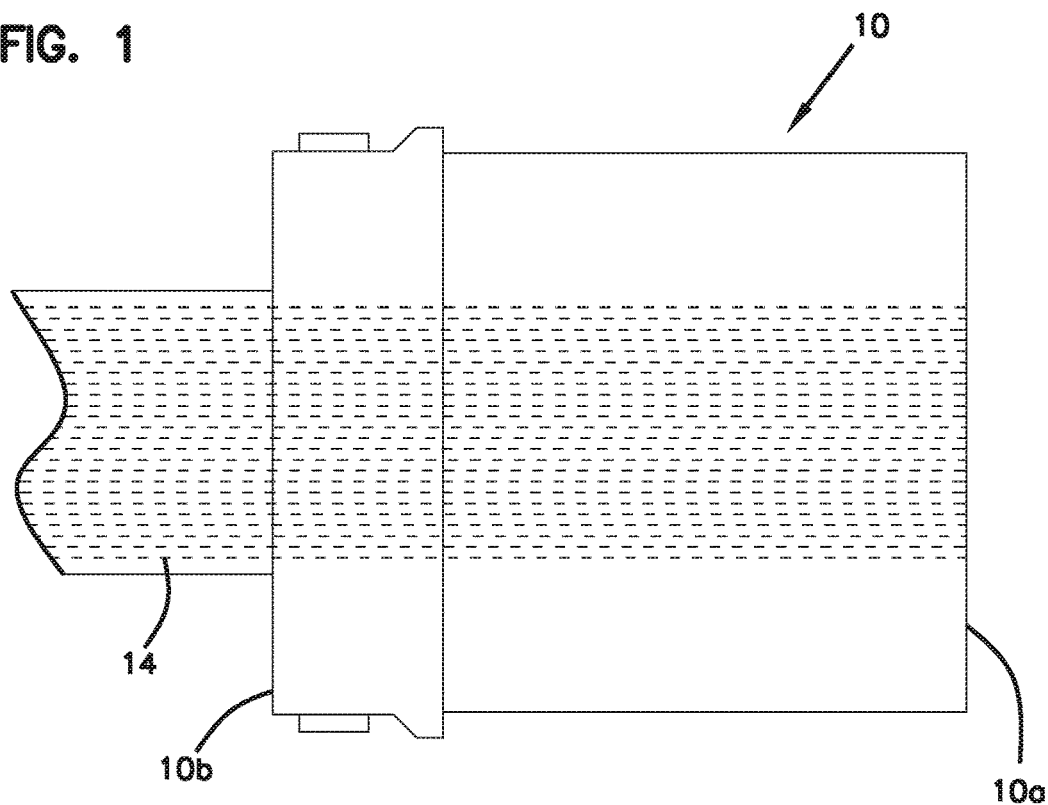
FIG. 1 is a top view of an example multi-fiber ferrule supporting a plurality of optical fibers in accordance with principles of the present disclosure.
Figure 2:
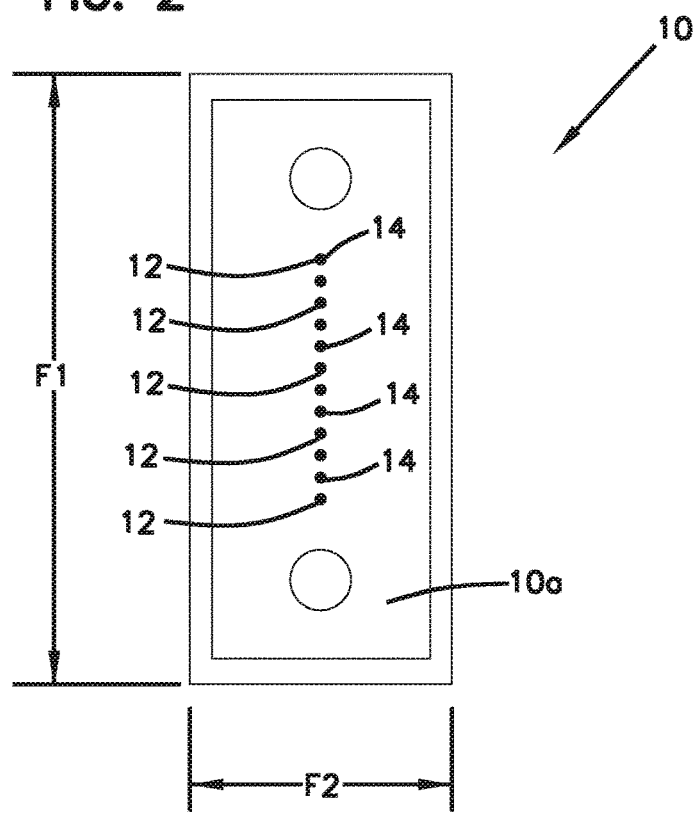
FIG. 2 is a distal end view of the multi-fiber ferrule of FIG. 1.
Figure 3:
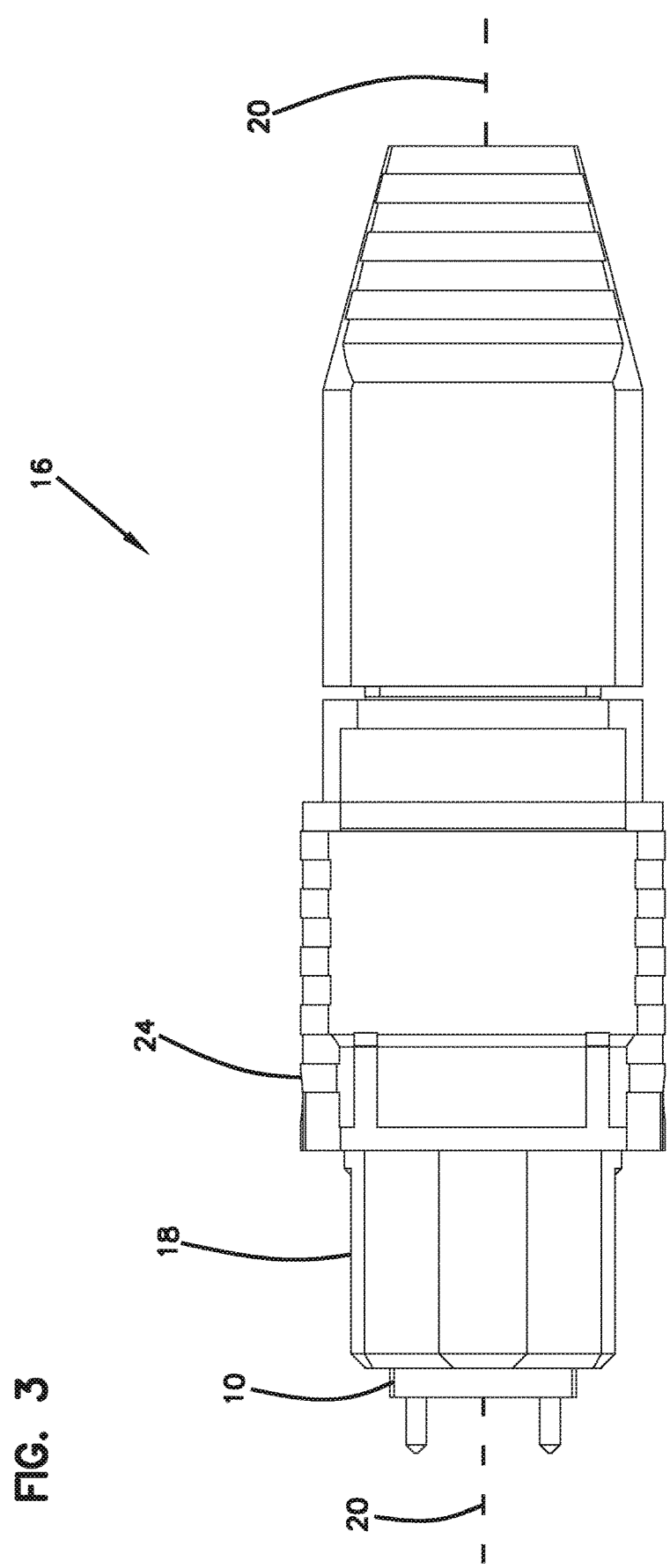
FIG. 3 is a top view of an example multi-fiber fiber optic connector in accordance with the principles of the present disclosure.
Figure 4:
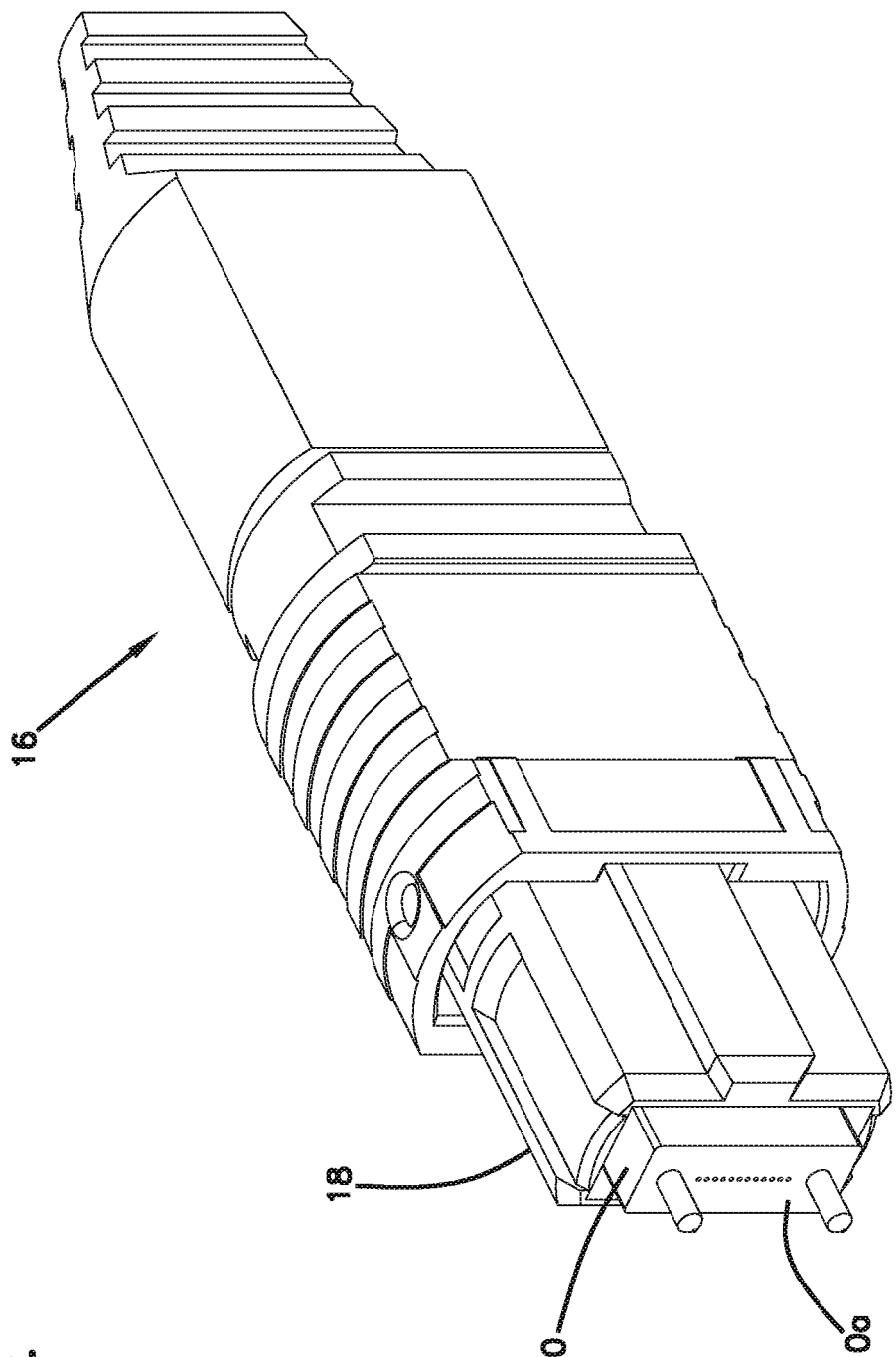
FIG. 4 is a front, perspective view of the multi-fiber fiber optic connector of FIG. 3.
Figure 5:
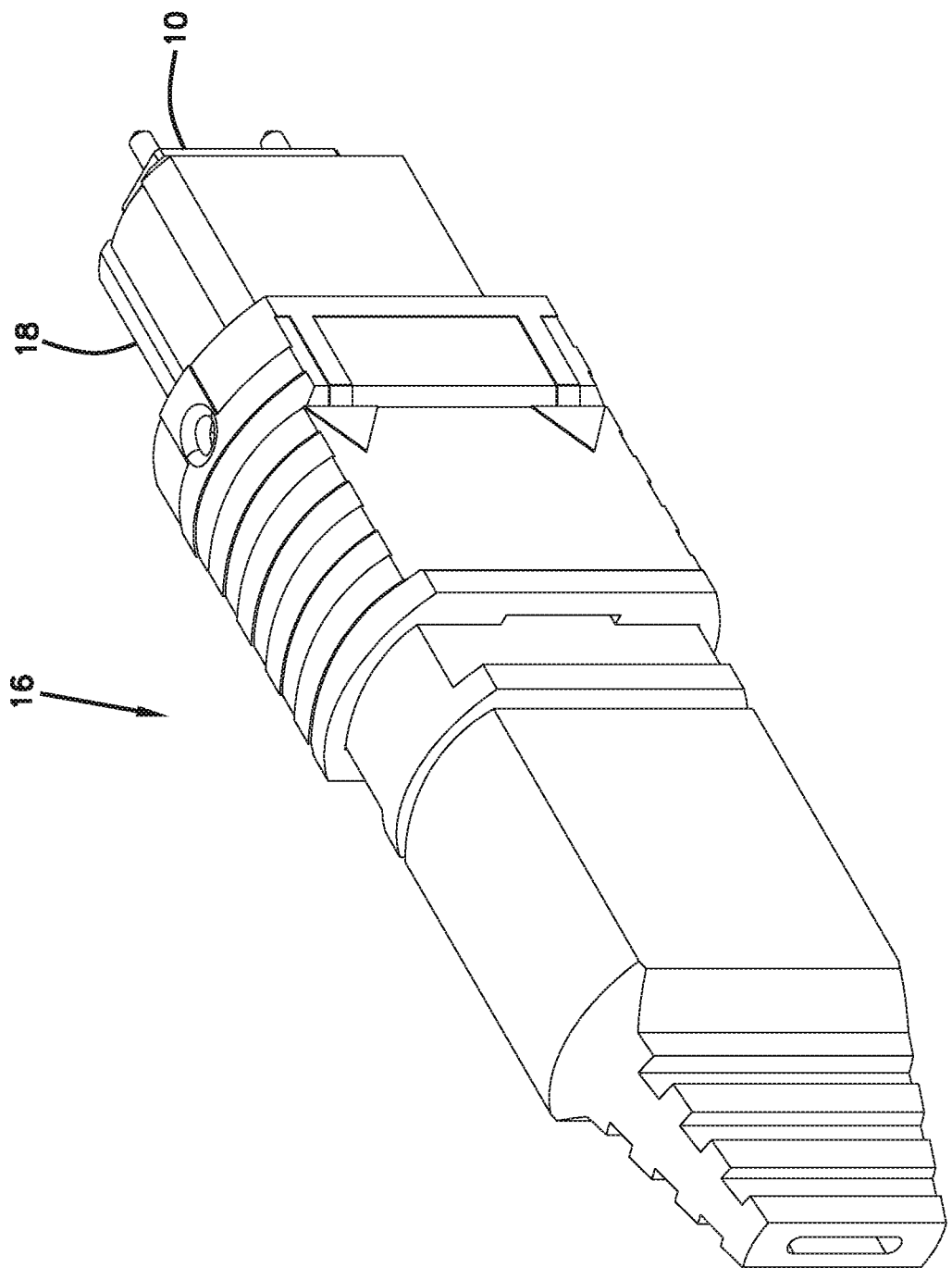
FIG. 5 is a back, perspective view of the multi-fiber fiber optic connector of FIG. 3.
Figure 6:
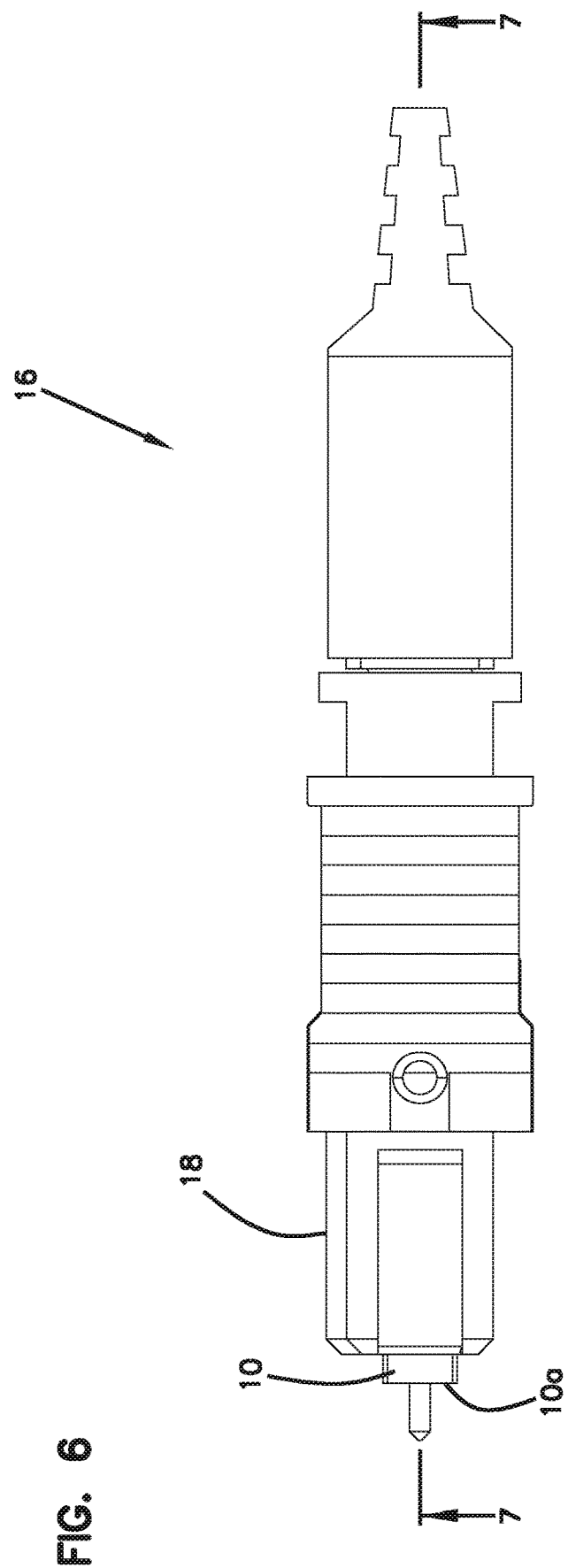
FIG. 6 is a side, perspective view of the multi-fiber fiber optic connector of FIG. 3.

Multi-fiber fiber optic connectors generally include multi-fiber ferrules. An example multi-fiber ferrule 10 is shown at FIGS. 1 and 2. The multi-fiber ferrule 10 includes a distal end 10a (i.e., a front end or free end) and a proximal end 10b (i.e., a base end or a rear end). The multi-fiber ferrule 10 defines one or more rows of fiber openings 12 (e.g., passages, bores) for receiving optical fibers 14. The multi-fiber ferrule 10 can include a rectangular ferrule profile defining a major dimension F1 and a minor dimension F2 that are perpendicular relative to one another. The row (s) of optical fibers 14 extend along the major dimension F1. In other examples, more than one row of fiber openings can be provided. In certain examples, each row can accommodate 12 optical fibers.

As used herein, the major dimension of a profile represents the largest dimension of the profile and the minor dimension represents the smallest dimension of the profile. Thus, the major dimension is longer than the minor dimension.

FIGS. 3-6 show an example multi-fiber fiber optic connector 16 in various perspective views. The multi-fiber fiber optic connector 16 includes a connector body 18 in which the multi-fiber ferrule 10 is mounted. The multi-fiber fiber optic connector 16 defines a longitudinal connector axes 20 (e.g., longitudinal central axis). The multi-fiber fiber optic connector 16 can include a spring 22 (see FIG. 7) that biases the multi-fiber ferrule 10 in a distal direction relative to the connector body 18. The spring 22 can have a base end that is supported by and seated upon a spring stop of the multi-fiber fiber optic connector 16. When two of the multi-fiber fiber optic connectors 16 are connected together, the multi-fiber ferrules 10 are forced in a proximal direction against the bias of corresponding springs 22 and the ends of the optical fibers 14 are co-axially aligned with one another so that light signals can pass between the optical fibers 14. Ideally, the spring 22 allows the multi-fiber ferrule 10 to "float" relative to the connector body 18 such that the multi-fiber ferrule 10 can move in the distal-to-proximal orientation and tilt/pivot relative to the connector bodies 18 along planes that includes the major dimensions F1 of the ferrules and the longitudinal connector axes 20 of the multi-fiber fiber optic connector 16.

Figure 7:
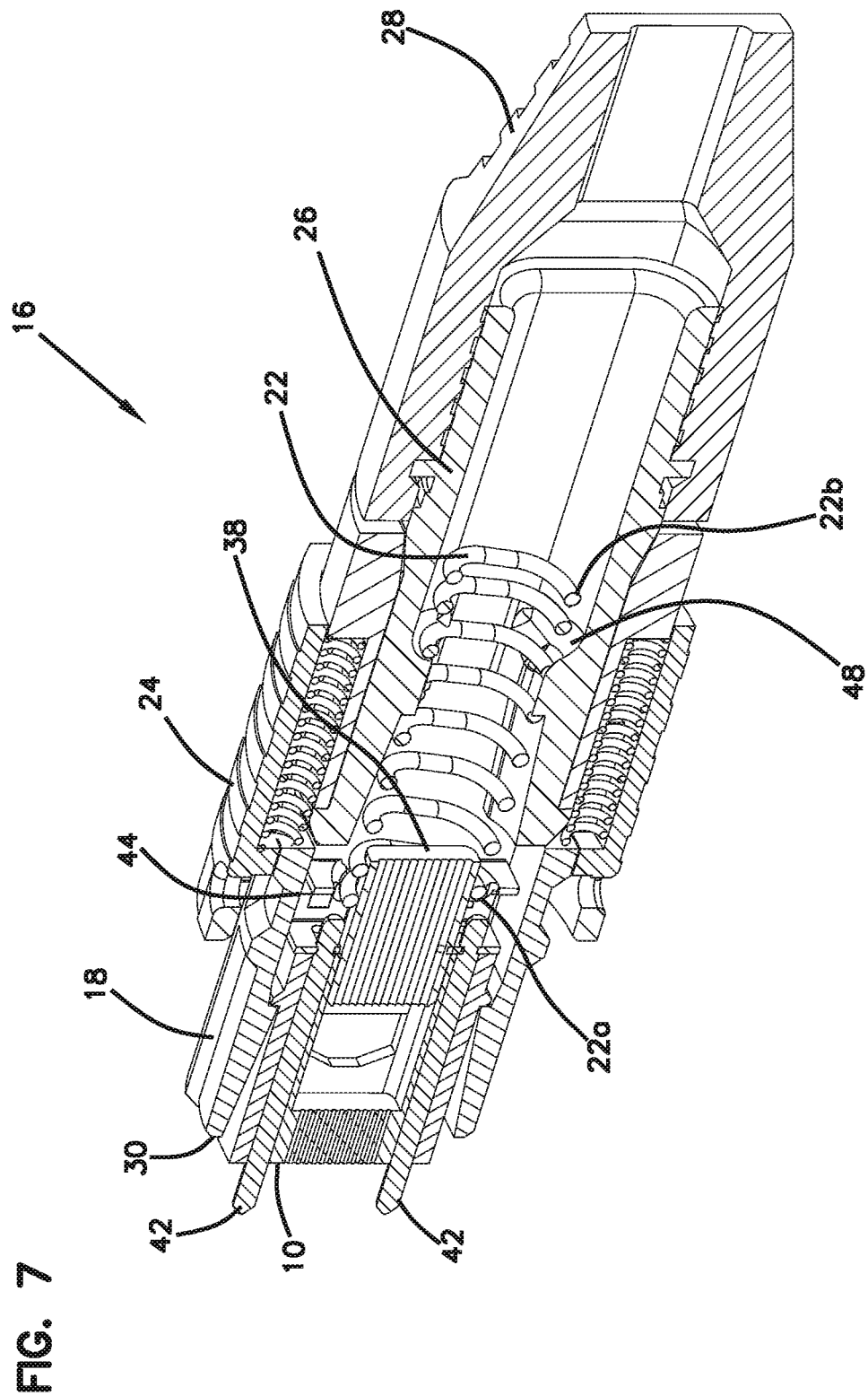
FIG. 7 is a cross-section view taken along section line 7-7 of FIG. 6.
Figure 8:
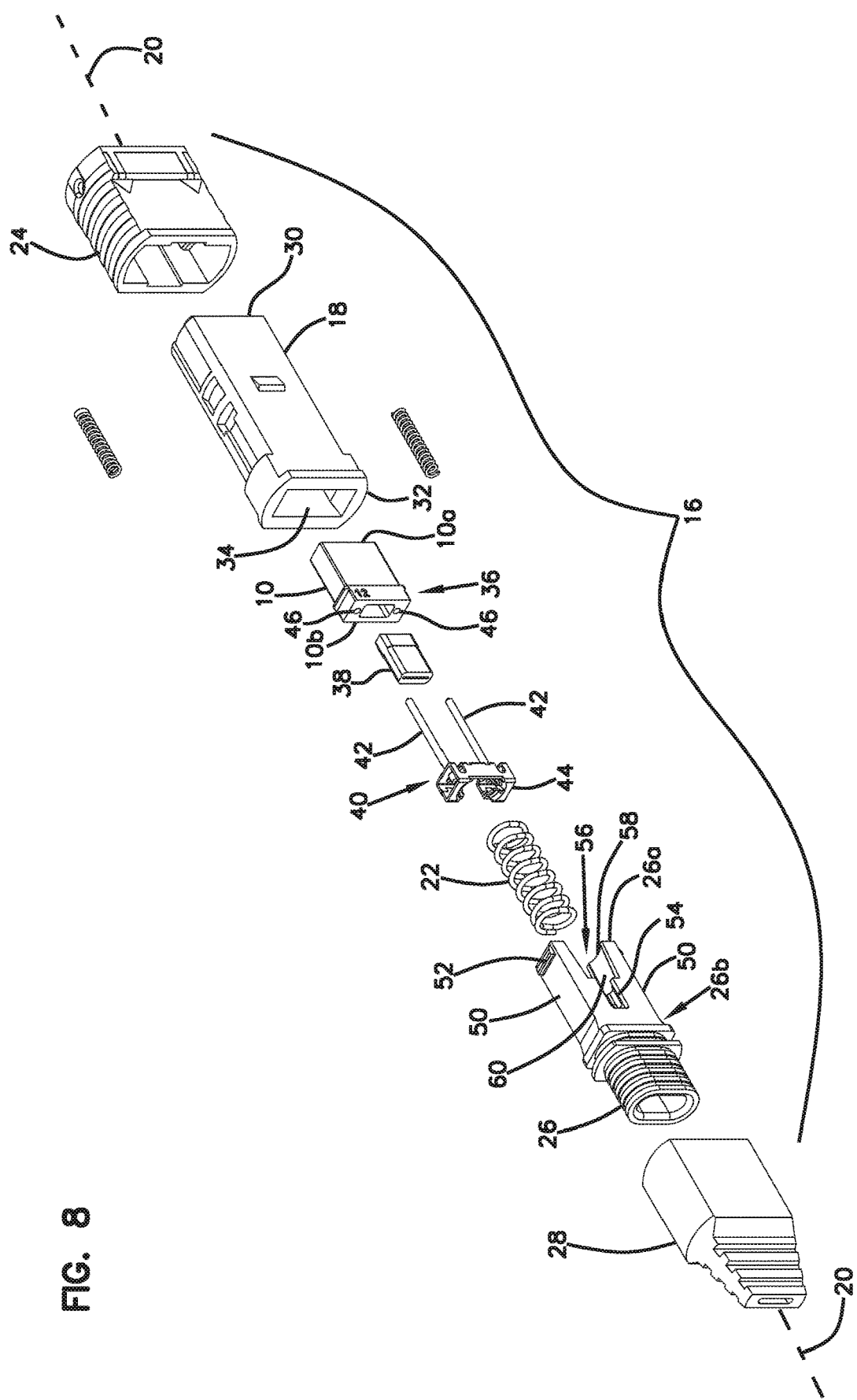
FIG. 8 is an exploded view of the multi-fiber fiber optic connector of FIG. 5.

Turning to FIGS. 7-8, the multi-fiber fiber optic connector 16 further includes a release sleeve 24, a spring push 26, and a connector boot 28. A dust cap (not shown) may mount over a distal end 30 of the connector body 18 and the spring push 26 loads into a proximal end 32 of the connector body 18. The release sleeve 24 is mounted on the connector body 18 and can slide over a limited range of movement in the distal-proximal orientation relative to the connector body 18. The release sleeve 24 can be spring biased in the distal direction and can be retracted from the distal position to release the multi-fiber fiber optic connector 16 from a mating fiber optic adapter (not shown). The connector boot 28 mounts over a proximal end of the spring push 26. As depicted, the connector body 18 can have an internal passageway 34 (e.g., ferrule passageway) having a length that extends along the longitudinal connector axis 20 from the distal end 30 to the proximal end 32.

A ferrule assembly 36 mounts within the internal passageway 34 of the connector body 18. The ferrule assembly 36 includes the multi-fiber ferrule 10. In certain examples, end faces of the optical fibers 14 are positioned at the distal end 10a of the multi-fiber ferrule 10. When the multi-fiber ferrule 10 is assembled within the connector body 18, the distal end 10a of the multi-fiber ferrule 10 is accessible at the distal end 30 of the connector body 18 so as to facilitate making an optical connection with another multi-fiber fiber optic connector. The ferrule assembly 36 further includes a ferrule boot 38 that mounts at the proximal end 10b of the multi-fiber ferrule 10. The ferrule boot 38 may be formed of a rubber material. The ferrule boot 38 is illustrated and described in more detail with reference to FIGS. 9-15.

The ferrule assembly 36 further includes an alignment pin assembly 40. The alignment pin assembly 40 includes alignment pins 42 having base ends supported within a pin base 44. The alignment pins fit within longitudinal pin openings 46 defined by the multi-fiber ferrule 10. The pin openings 46 can be positioned on opposite sides of the rows of fiber openings 12. The pin base 44 mounts at the proximal end 10b of the multi-fiber ferrule 10. As so mounted, the alignment pins 42 project distally beyond the distal end 10a of the multi-fiber ferrule 10. Thus, the depicted ferrule corresponds to a "male" multi-fiber connector. In use, the alignment pins 42 are adapted to fit within corresponding pin openings defined by a mating female multi-fiber ferrule to provide alignment between the optical fibers of the mated ferrules. It will be appreciated that, in a female version of the multi-fiber ferrule 10, the pin base 44 can support shorter pins that extend only a relatively short distance distally into the pin openings 46 such that distal portions of the pin openings 46 are open.

The optical fibers 14 can form or be part of a cable to which the multi-fiber fiber optic connector 16 is mounted. For example, the optical fiber can by itself form the cable.

In other examples, the cable can include the optical fibers and a protective jacket or sheath surrounding the optical fibers. In still other examples, the cable can include the optical fibers, a protective jacket and one or more strength members such as aramid yarn. The strength members can be coupled (e.g., crimped) to a proximal end of the spring push of the multi-fiber fiber optic connector 16. In certain examples, the cable can include a tube, the optical fibers, a protective jacket, and one or more strength members.

The optical fibers 14 are loose, individual fibers. As used herein, the term, "loose fibers" and variants thereof, in this context, means that the optical fibers can move relative to one another. A fiber optic cable may be one of a variety of well known cable types. In certain examples, the ferrule boot 38 may be applicable for use with loose fibers of a fiber optic cable that are positioned within a buffer tube of the fiber optic cable. In certain examples, the ferrule boot 38 may be applicable for use with loose fibers of a fiber optic cable that are surrounded by strength members (e.g., reinforcing fibers such as aramid yarn/Kevlar). In certain examples, the ferrule boot 38 may be used with a rollable ribbon. In certain examples, the ferrule boot 38 may be used with non-ribbonized fibers.

Figure 8A:
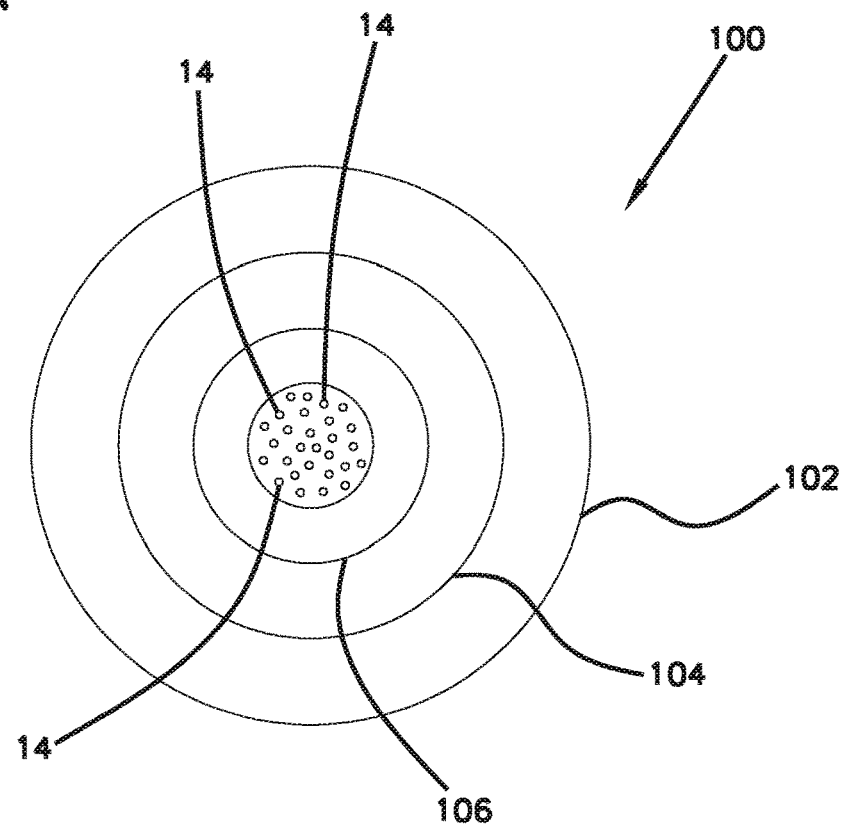
FIG. 8A is a cross-section view of an example fiber optic cable having a loose optical fiber configuration in accordance with the principles of the present disclosure.

Turning to FIG. 8A, a cross-sectional view of an example fiber optic cable 100 is depicted. The fiber optic cable 100 includes multiple loose optical fibers 14, a cable jacket 102, a strength structure 104 (e.g., reinforcing fiber, strength member such as aramid yarn/Kevlar), and a tube 106 that surrounds the multiple optical fibers 14 and separates the optical fibers 14 from the strength structure 104. The cable jacket 102 surrounds the strength structure 104.

Figure 8B:
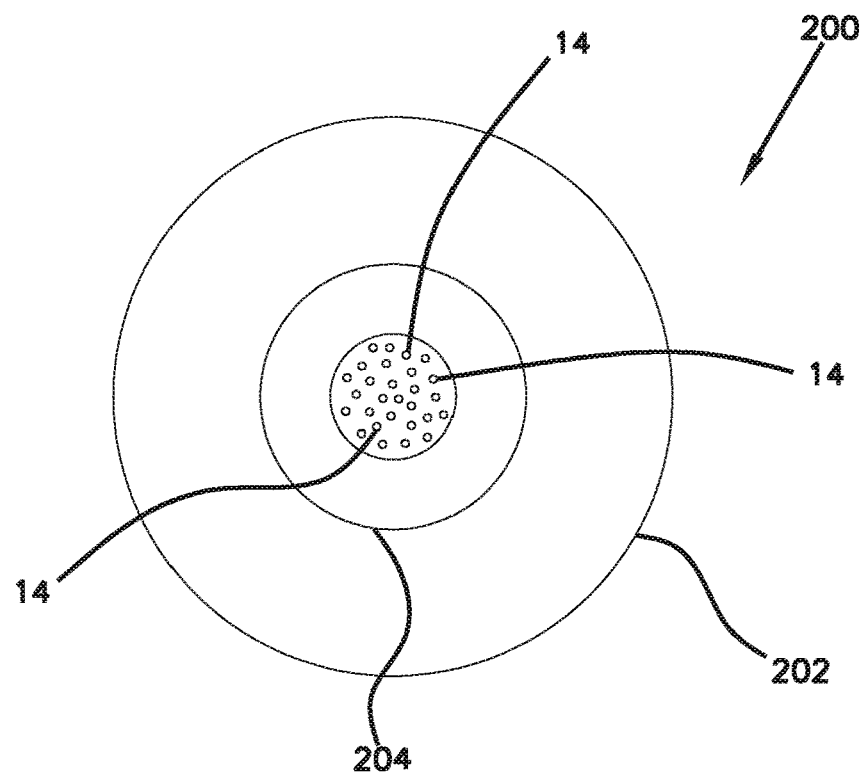
FIG. 8B is a cross-section view of another example fiber optic cable having a loose optical fiber configuration in accordance with the principles of the present disclosure.
Figure 9:
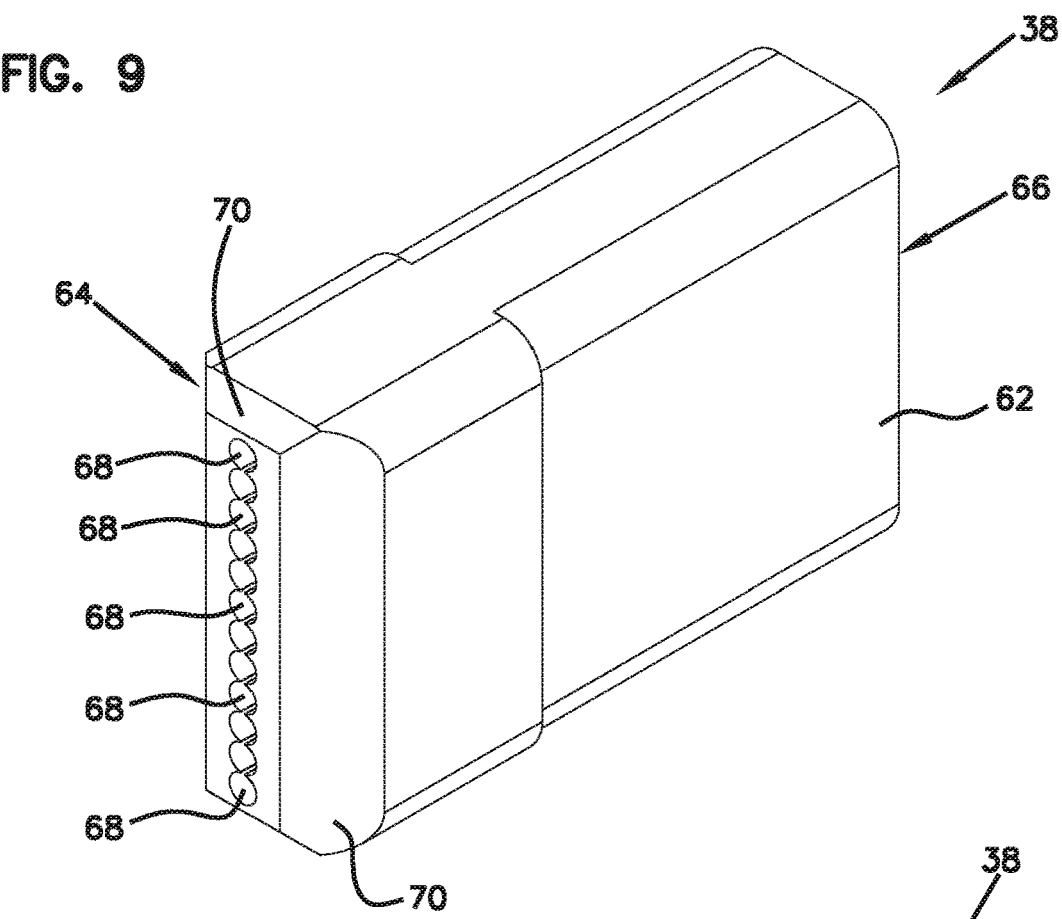
FIG. 9 is a distal, perspective view of an example ferrule boot in accordance with the principles of the present disclosure.
Figure 10:
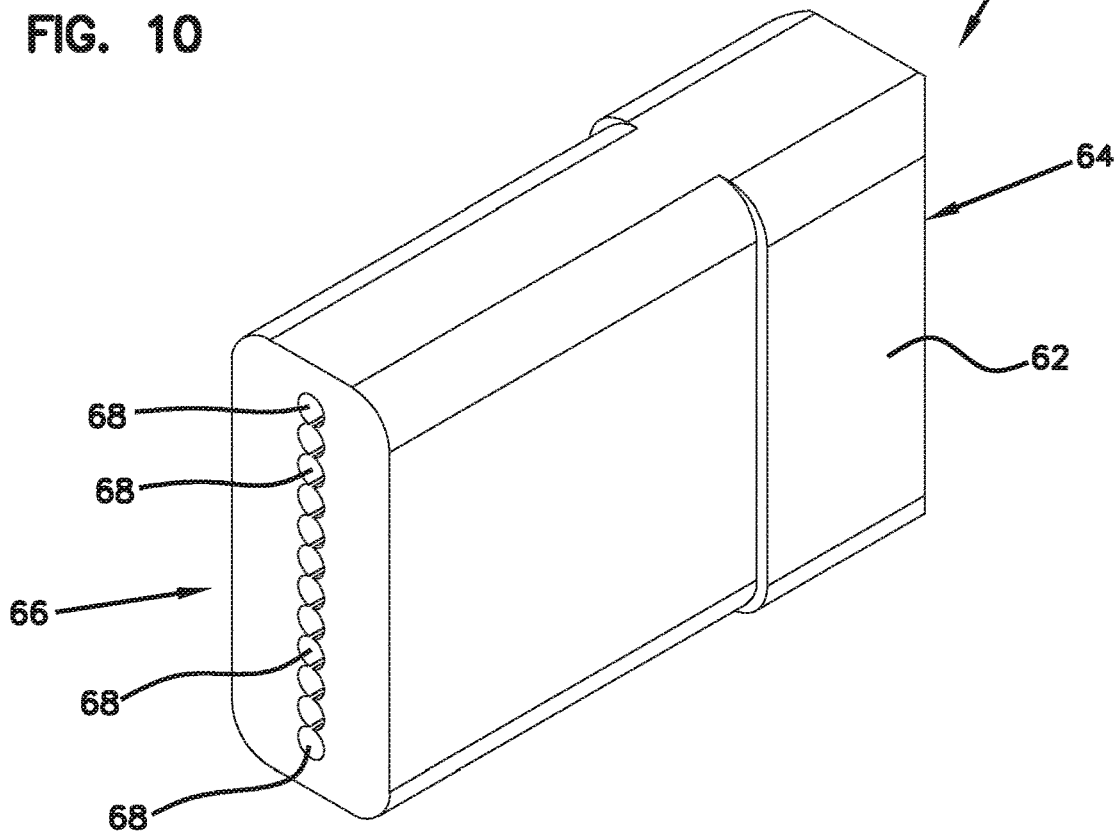
FIG. 10 is a proximal, perspective view of the ferrule boot of FIG. 9.
Figure 11:
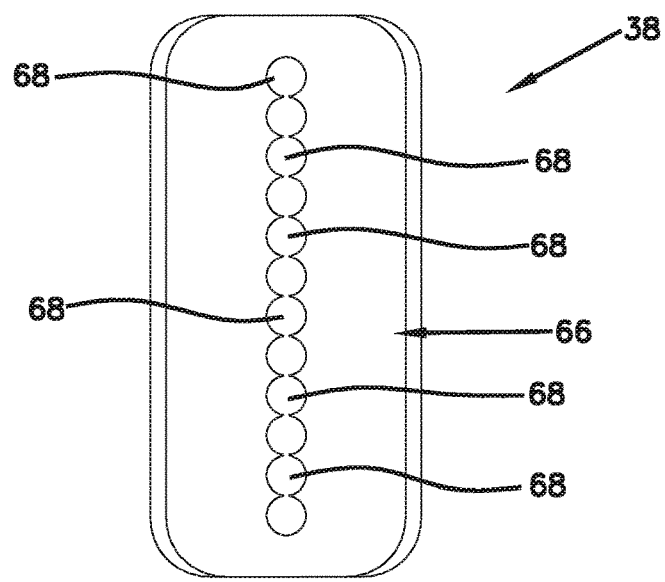
FIG. 11 is a proximal, end view of the of the ferrule boot of FIG. 9.
Figure 12:
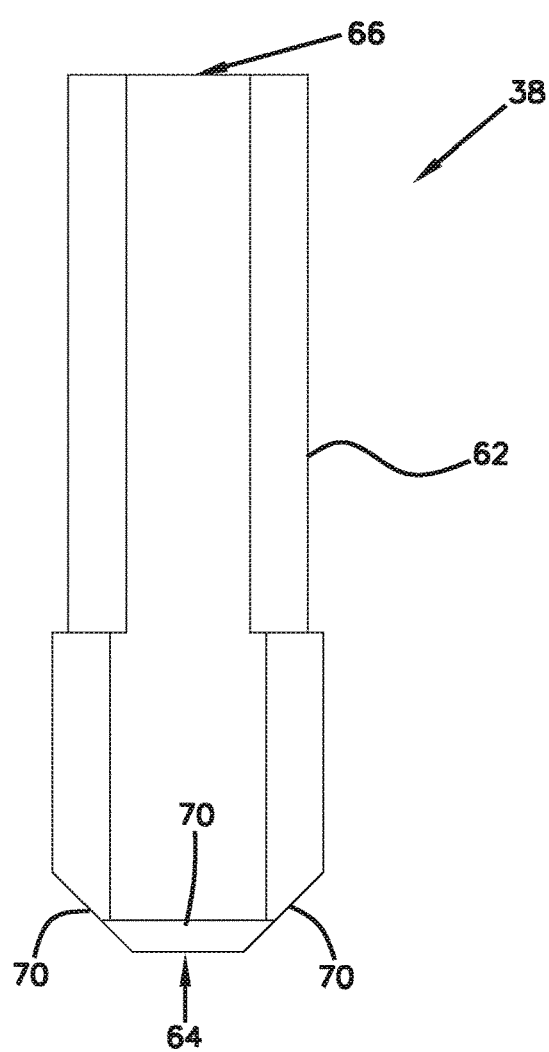
FIG. 12 is a side view of the ferrule boot of FIG. 9.
Figure 13:
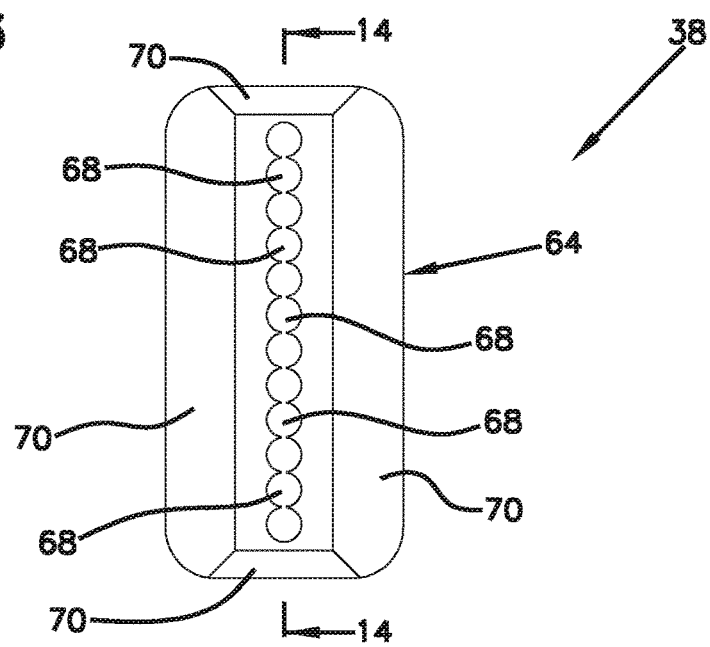
FIG. 13 is a distal, end view of the ferrule boot of FIG. 9.
Figure 14:
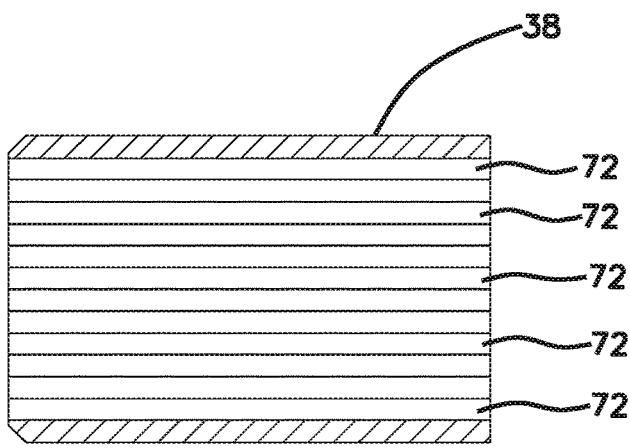
FIG. 14 is a top, cross-section view taken along section line 14-14 of the ferrule boot of FIG. 13.
Figure 15:
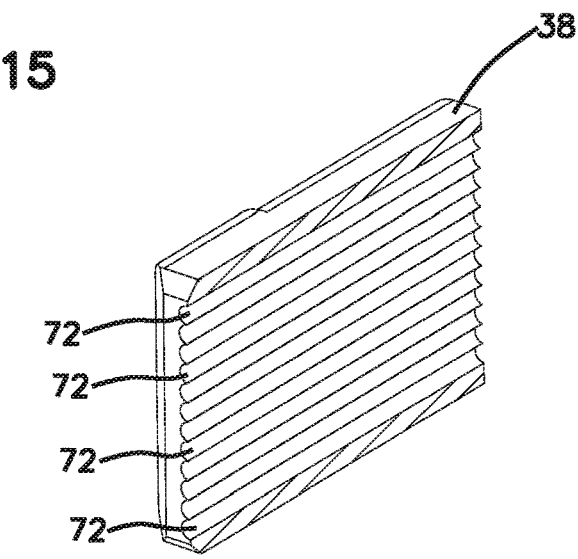
FIG. 15 is a perspective, cross-section view of the ferrule boot of FIG. 14.
Figure 16:
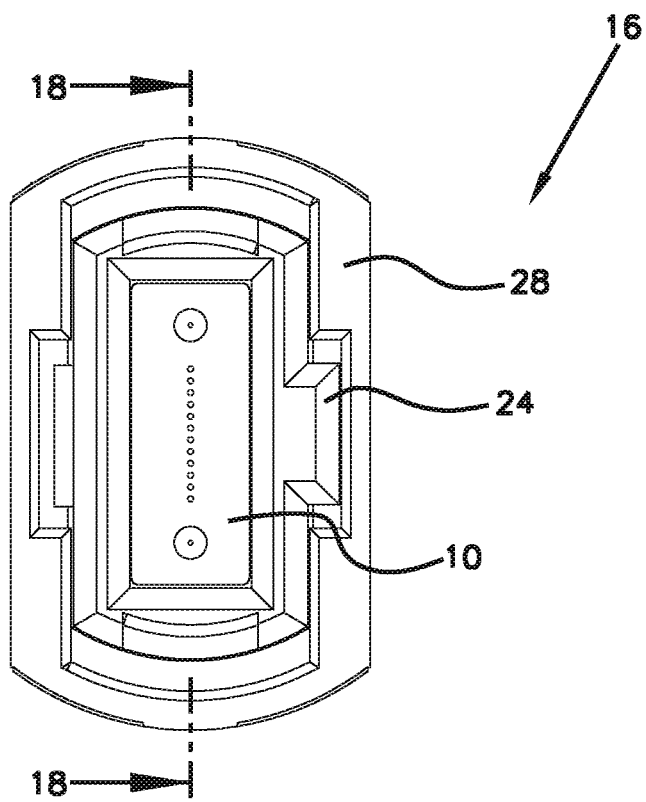
FIG. 16 is a distal end view of the multi-fiber fiber optic connector of FIG. 3.
Figure 17:
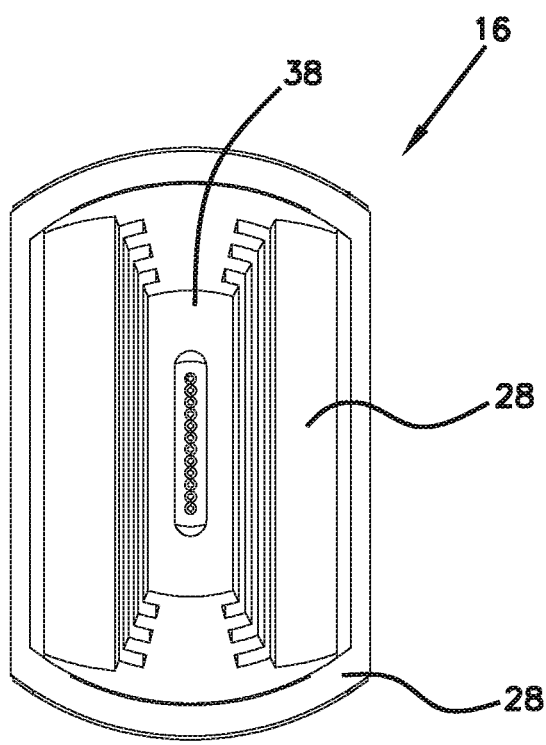
FIG. 17 is a proximal end view of the multi-fiber fiber optic connector of FIG. 3.
Figure 18:
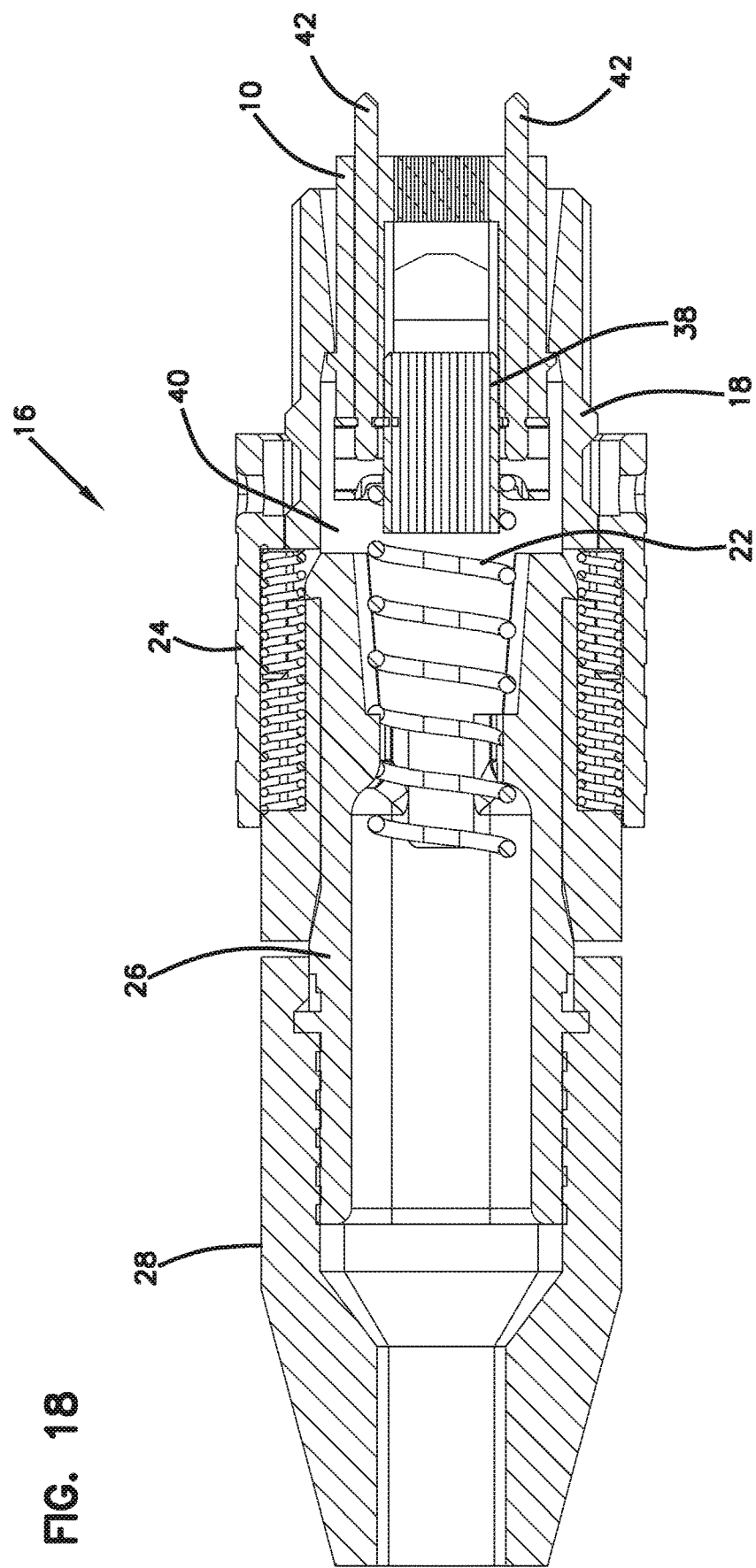
FIG. 18 is a cross-section view taken along section line 18-18 of FIG. 16.

Turning to FIG. 8B, a cross-sectional view of another example fiber optic cable 200 is depicted. The fiber optic cable 200 includes multiple loose optical fibers 14, a cable jacket 202 and a strength structure 204 (e.g., reinforcing fiber, strength member, such as aramid yarn/Kevlar) that surrounds the multiple optical fibers 14. The cable jacket 202 surrounds the strength structure 204.

The spring 22 of the multi-fiber fiber optic connector 16 functions to bias the multi-fiber ferrule 10 in a distal direction relative to the connector body 18. When the multi-fiber fiber optic connector 16 is assembled, the spring 30 can be captured between the proximal end 10b of the multi-fiber ferrule 10 and the spring push 26. A distal end 22a of the spring 22 can engage the pin base 44 of the ferrule assembly 36 and a proximal end 22b of the spring 22 can engage a spring seat 48 of the spring push 26. The optical fibers 14 pass through an interior of the spring 22. In certain examples, the spring 22 includes a coiled wire.

The spring push 26 includes a distal end 26a and a proximal end 26b. The spring push 26 includes a pair of latch arms 50 at the distal end 26a. The latch arms 50 include latching tabs 52 that snap within corresponding receptacles defined within the connector body 18 when the spring push 26 is loaded into the proximal end 32 of the connector body 18. In this way, the latch arms 50 function to retain the spring push 26 at a fixed axial position within the internal passageway 34 of the connector body 18. The spring push 26 can include cut-out portions 54 that enhance the flexibility of the latch arms 50 to allow the latch arms 50 to flex together during insertion of the spring push 26 into the proximal end 32 of the connector body 18. When the spring push 26 is inserted fully in the connector body 18, the latch arms 50 snap outwardly to a retaining position in engagement with the connector body 18. As shown at FIG. 8, the latch arms 50 cooperate to define a spring pocket 56 configured for receiving the proximal end 22b of the spring 22. The spring pocket 56 has a profile with rounded ends 58 defined by opposing inner surfaces 60 of the latch arms 50.

In assembling the multi-fiber fiber optic connector 16, the optical fibers 14 can be processed to remove coating material from distal ends of the optical fibers 14 to provide bare fiber segments. The bare fiber segments are preferably bare glass that includes a core surrounded by a cladding layer. The bare fiber segments are bonded within the multi-fiber ferrule 10. That is, the bare fiber segments of the optical fibers 14 can be loaded into the multi-fiber ferrule 10 and secured with epoxy (e.g., adhesive) within the fiber openings 12. The distal end face of the multi-fiber ferrule 10 can then be processed by polishing or other means. After polishing, the alignment pin assembly 40 can be secured to the multi-fiber ferrule 10. The coated segment of the optical fibers 14 can be passed through the connector boot 28, the spring push 26, the spring 22 and the ferrule boot 38. In certain embodiments, the coating layer or layers can include a polymeric material such as acrylate having an outer diameter in the range of about 230-260 microns.

Because the optical fibers 14 are loose, there is no need to perform a de-ribbonizing process prior to loading into the multi-fiber fiber optic connector 16. The de-ribbonizing process can include de-bonding a section of matrix material of a ribbonized fiber. The ferrule assembly 36 and the spring 22 can then be loaded into the connector body 18 through the proximal end 32 of the connector body 18. Next, the spring push 26 is then snapped into the proximal end 32 of the connector body 18 to capture the spring 22 and the ferrule assembly 36 within the connector body 18. Thereafter, the connector boot 28 is pressed over the proximal end 26b of the spring push 26.

Referring to FIGS. 9-15, the ferrule boot 38 includes a main body 62 (e.g., body member) having a distal end 64 and a proximal end 66. The main body 62 defines a plurality of openings 68 (e.g., individual openings, passages, holes) that extend lengthwise through the main body 62 between the distal and proximal ends 64, 66. The plurality of openings 68 can be coaxially aligned with the fiber openings 12 of the multi-fiber ferrule 10.

As depicted, the plurality of openings 68 include 12 separate identifiable fiber receiving regions. In certain examples, the plurality of openings 68 may be fully closed between the 12 separate identifiable fiber receiving regions. In certain examples, the plurality of openings 68 may be partially closed between the 12 separate identifiable fiber receiving regions. Of course, in other examples, different numbers of openings can be provided. The openings 68 of the ferrule boot 38 can define open ends for inserting the optical fibers 14 in discrete configurations. In certain examples, the ferrule boot 38 is adapted for receiving and guiding the optical fibers 14 into the multi-fiber ferrule 10.

The center-to-center spacing of the plurality of openings 68 can correspond to a coating diameter of an optical fiber. That is, the spacing in the ferrule boot 38 can be configured to correspond with the coating diameter of the optical fiber. In certain examples, the plurality of openings 68 can have a dimension sized large enough to receive a respective one of the optical fibers 14 including an outer coating at 250 microns. As such, the center-to-center spacing of the plurality of openings 68 will also be 250 microns. That is, the ferrule boot 38 can be configured with a 250 micron pitch. In certain examples, the openings 68 can have a uniform diameter sized for receipt of the fiber at 250 microns, although alternatives are possible. In certain examples, the optical fiber may include a 200 micron coating that would correspond with a ferrule boot having a 200 micron pitch.

A preferred range for the dimension of the plurality of openings 68 is greater than or equal to 250 micros and less than or equal to 500 microns, although alternatives are possible. A more preferred range of the dimension of the plurality of openings 68 is greater than or equal to 250 microns and less than or equal to 300 microns, although alternatives are possible.

In certain examples, the distal end 64 of the ferrule boot 38 may include tapered portions 70 (e.g., tapered lead-in) to provide easier insertion and/or positive fit of a portion of the ferrule boot 38 within the multi-fiber ferrule 10. Additionally, the tapered portions 70 of the ferrule boot 38 allow the ferrule boot 38 to be pressed into the multi-fiber ferrule 10 such that the openings 68 close and clamp down on the optical fibers 14 to form a good seal that prevents epoxy from leaking between the ferrule boot 38 and the multi-fiber ferrule 10 and thereby avoid contamination.

Turning to FIGS. 13-18, multiple views of the multi-fiber fiber optic connector 16 and the ferrule boot 38 is depicted.

The ferrule boot 38 defines a plurality of grooves 72 (e.g., more than two grooves, slots, recesses, longitudinal grooves, discrete independent structures) for receiving the optical fibers 14. The plurality of grooves 72 may be arranged and configured as indentations in the ferrule boot 38. The plurality of grooves 72 aligns and positions the optical fibers 14 for insertion into the multi-fiber ferrule 10. That is, the plurality of grooves 72 can be arranged and configured to maintain the position and order of the optical fibers 14 so that the optical fibers 14 can quickly and easily be inserted into the openings 12 of the multi-fiber ferrule 10. The optical fibers 14 may extend through both distal and proximal ends 64, 66 of the ferrule boot 38. The optical fibers 14 can be routed through the ferrule boot 38. In certain examples, the plurality of grooves 72 may be arranged and configured parallel to one another. It is a common industry practice to number the grooves and call them out as fiber positions from left to right.

Figure 19:
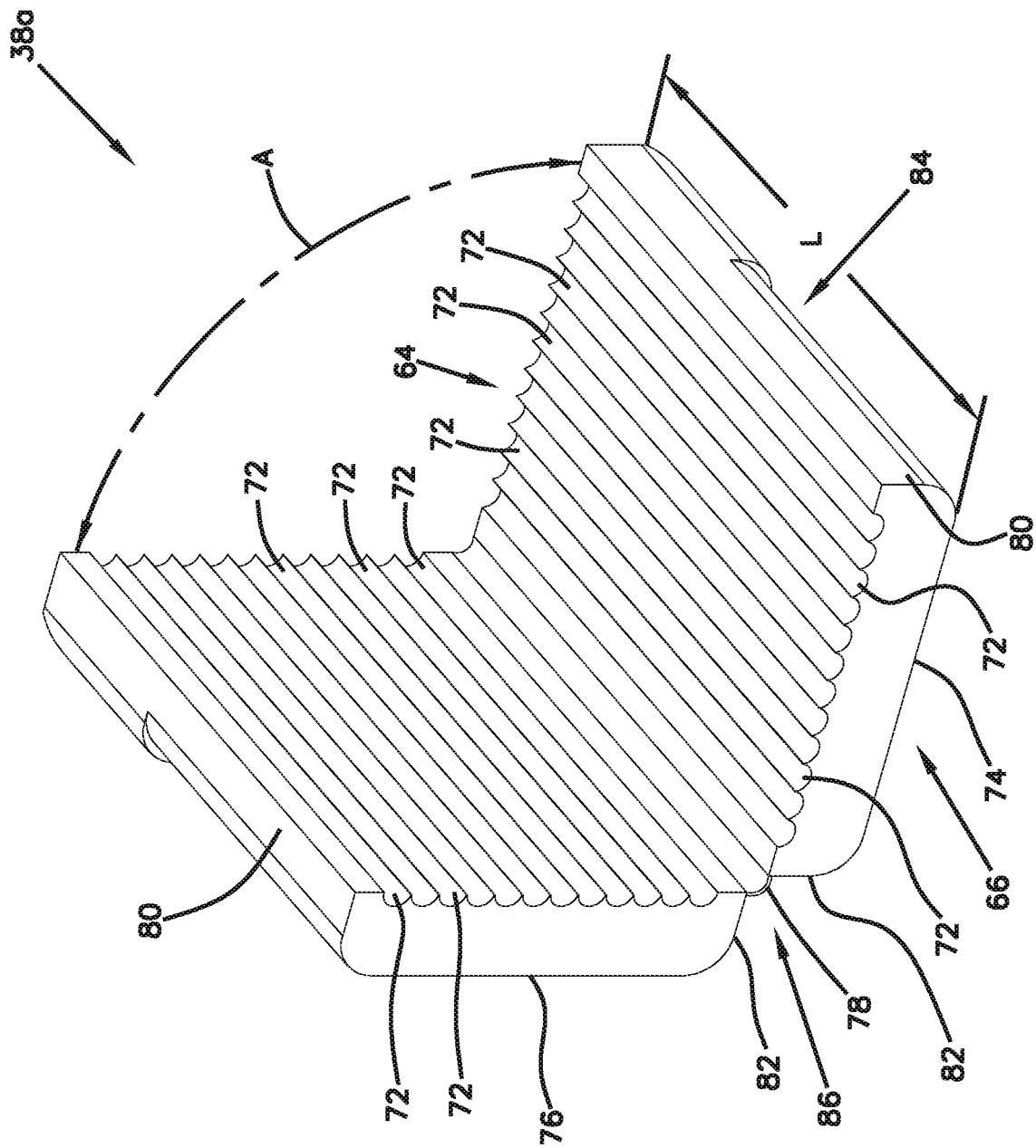
FIG. 19 is another example ferrule boot with two halves interconnected via a flexible hinge in accordance with the present disclosure.

Turning to FIG. 19, another example ferrule boot 38a is depicted. The ferrule boot 38a can be divided into two halves 74, 76 (e.g., parts, pieces) that can be interconnected via an integral, flexible, living hinge 78, although alternatives are possible. Each of the two halves 74, 76 may include separate, independent structure that corresponds to an individual optical fiber. The halves 74, 76 can each have first and second side portions 80, 82 that cooperate to define first and second sides 84, 86 of the ferrule boot 38a when the two halves 74, 76 are in the closed position. The flexible hinge 78 can be arranged and configured to mount at the first side 84 of the ferrule boot 38a to provide a hinged connection, or can be mounted at the second side 86 of the ferrule boot 38a to provide a hinged connection.

The flexible hinge 38a allows the halves 74, 76 to move between first and second positions (i.e., open and closed positions). The halves 74, 76 can pivot about an axis A defined by the living hinge 78. The ferrule boot 38a can be "opened" so as to wrap around the optical fibers 14 such that the optical fibers 14 are positioned in the plurality of grooves 72. In certain examples, the plurality of grooves 72 may each have a tapered portion that constitutes a clamping means about the optical fibers 14. That is, the plurality of grooves 72 of the ferrule boot 38a can have dimensions that reduce in size in a tapered configuration as the grooves extend along a length L of the ferrule body 38a between the distal and proximal ends 64, 66. The tapered portion of the plurality of grooves 72 may be arranged and configured to tighten about the optical fibers 14 when the halves 74, 76 are pivoted to the closed position to capture the optical fibers 14 in the plurality of grooves 72. The plurality of grooves 72 are adapted to form the openings 68 when the two halves 74, 76 are pivoted to the closed position. In certain examples, when the two halves 74, 76 are in a closed position, the openings 68 may be fully closed, completely separated. In certain examples, when the two halves 74, 76 are in a closed position, the openings 68 may be partially closed (e.g., not completely closed) to allow for small gaps therebetween.

Turning to FIG. 20, another example ferrule boot 38b is depicted. The ferrule boot 38b may include a main body 62a of the ferrule boot 38b may be provided with a longitudinal slot 88 (e.g., slit, opening). Both of the first and second side portions 80, 82 may define the longitudinal slot 88 through the wall thereof through which the optical fibers 14 may be received. That is, the optical fibers 14 are not required to be inserted through respective openings 16 at the distal or proximal ends 64, 66 of the ferrule boot 38b. The ferrule boot 38b can be arranged and configured to simply slide over the optical fibers 14 through the longitudinal slot 88.

From the forgoing detailed description, it will be evident that modifications and variations can be made without departing from the spirit and scope of the disclosure.

What is claimed is:

1. A ferrule boot for protecting loose optical fibers connected to a connector assembly, the ferrule boot comprising:
   a seamless unitary body member having a distal end and a proximal end, the body member defining a plurality of openings that extend lengthwise therethrough for receiving a plurality of optical fibers such that the body member is not openable; and
   a tapered lead-in located at the distal end of the body member such that when the body member of the ferrule boot is inserted into a ferrule connector, the plurality of openings close tighter about the plurality of optical fibers.

2. The ferrule boot of claim 1, wherein the loose optical fibers are insertable from the distal end of the body member to the proximal end of the body member.

3. The ferrule boot of claim 1, wherein the plurality of openings are sized larger than the plurality of optical fibers.

4. The ferrule boot of claim 1, wherein a dimension of each one of the plurality of openings is about 300 microns.

5. A multi-fiber fiber optic connector comprising:
   a connector body having a distal end and a proximal end;
   a multi-fiber ferrule having an end face accessible at the distal end of the connector body, the multi-fiber ferrule having a row of fiber holes for supporting a plurality of optical fibers;
   a ferrule boot coupled to the multi-fiber ferrule, the ferrule boot comprising a seamless unitary body member defining a plurality of openings that extend lengthwise therethrough for receiving the plurality of optical fibers such that the body member is not openable and including a tapered lead-in located at a distal end of the ferrule boot such that when the ferrule boot is inserted into the multi-fiber ferrule, the plurality of openings are adapted to close tighter about the plurality of optical fibers;
   a spring push positioned behind the multi-fiber ferrule;
   a spring positioned between the spring push and the multi-fiber ferrule for biasing the multi-fiber ferrule in a distal direction relative to the connector body; and
   a connector boot that mounts at the proximal end of the connector body to provide bend radius protection.

6. The multi-fiber fiber optic connector of claim 5, further comprising an epoxy securing the plurality of optical fibers in the respective fiber holes.

7. The multi-fiber fiber optic connector of claim 5, wherein the plurality of optical fibers are insertable from a distal end of the ferrule boot to a proximal end of the ferrule boot.

8. The multi-fiber fiber optic connector claim 5, wherein the plurality of openings are sized larger than the plurality of optical fibers.

9. A connectorized fiber optic cabling assembly comprising:
- a fiber optic cable that includes:
  - a plurality of optical fibers;
  - at least one strength member that surrounds the plurality of optical fibers; and
  - a cable jacket that surrounds the at least one strength member; and
- a connector assembly mounted on a first end of the fiber optic cable, the connector assembly including:
  - a connector housing that defines a fiber passage;
  - a multi-fiber ferrule mounted within the connector housing;
  - a ferrule boot coupled to the multi-fiber ferrule, the ferrule boot comprising a seamless unitary body member defining a plurality of openings that extend lengthwise therethrough for receiving the plurality of optical fibers such that the body member is not openable and including a tapered lead-in located at a distal end of the ferrule boot such that when the ferrule boot is inserted into the multi-fiber ferrule, the plurality of openings are adapted to close tighter about the plurality of optical fibers;
  - a spring mounted within the connector housing rearward of the multi-fiber ferrule; and
  - a strain relief boot extending rearwardly from the connector housing,
- wherein the plurality of optical fibers extend through the strain relief boot, the fiber passage and the spring into the ferrule boot and the multi-fiber ferrule; and
- wherein the plurality of optical fibers are aligned in a row in a loose configuration within the ferrule boot.

* * * * *